United States Patent
Hashimoto et al.

(10) Patent No.: US 11,121,610 B2
(45) Date of Patent: Sep. 14, 2021

(54) METHOD OF MANUFACTURING LAMINATED CORE

(71) Applicant: Mitsui High-tec, Inc., Kitakyushu (JP)

(72) Inventors: Akihiro Hashimoto, Kitakyushu (JP); Takahiro Shimizu, Kitakyushu (JP)

(*) Notice: Subject to any disclaimer, the term of this patent is extended or adjusted under 35 U.S.C. 154(b) by 259 days.

(21) Appl. No.: 16/158,633

(22) Filed: Oct. 12, 2018

(65) Prior Publication Data
US 2019/0115811 A1    Apr. 18, 2019

(30) Foreign Application Priority Data
Oct. 16, 2017   (JP)   .............................. JP2017-200173

(51) Int. Cl.
*H02K 15/02*    (2006.01)
*H02K 1/14*     (2006.01)
*B21D 28/22*    (2006.01)

(52) U.S. Cl.
CPC ........... *H02K 15/026* (2013.01); *H02K 1/148* (2013.01); *H02K 15/024* (2013.01); *B21D 28/22* (2013.01); *H02K 1/146* (2013.01); *Y10T 29/49078* (2015.01)

(58) Field of Classification Search
CPC .... H02K 15/024; H02K 15/026; H02K 1/146; H02K 1/148; B21D 28/22; Y10T 29/49078
See application file for complete search history.

(56) References Cited

U.S. PATENT DOCUMENTS

| 6,058,596 | A  | * | 5/2000  | Jansen | ............... | B21D 28/22 310/211 |
| 2010/0327690 | A1 | * | 12/2010 | Umeda | ............... | H02K 15/024 310/216.011 |
| 2018/0026501 | A1 |   | 1/2018  | Ogikubo et al. | | |

FOREIGN PATENT DOCUMENTS

| JP | H1-190235 | | 7/1989 | | |
| JP | 2002-346651 | | 12/2002 | | |
| JP | 2005-198361 | | 7/2005 | | |
| JP | 2015-188934 | | 11/2015 | | |
| JP | 2017038453 | A | * | 2/2017 | ............... H02K 1/06 |
| WO | 2016/147214 | | 9/2016 | | |

OTHER PUBLICATIONS

Machine Translation of Japanese Patent Publication JP 2005-198361, Nov. 2020. (Year: 2020).*

* cited by examiner

*Primary Examiner* — A. Dexter Tugbang
(74) *Attorney, Agent, or Firm* — Soei Patent & Law Firm (57) ABSTRACT

A method of manufacturing a laminated core includes supplying a stator material to a punching device and obtaining an electromagnetic steel plate corresponding to a rectangular processed body by punching the stator material. To obtain the electromagnetic steel plate ES, a slit is formed outside a processed body forming area in the stator material along a long side of the processed body forming area, and a center portion of the processed body forming area is punched out in a circular shape. Additionally, the processed body forming area is punched out after the slit is formed and the center portion is punched out. The laminated core is obtained by laminating and fastening a plurality of the electromagnetic steel plates.

3 Claims, 10 Drawing Sheets

METHOD OF MANUFACTURING LAMINATED CORE

CROSS-REFERENCE TO RELATED APPLICATIONS

This application claims the benefit of priority from Japanese Patent Application No. P2017-200173, filed Oct. 16, 2017, the entire contents of which are incorporated herein by reference.

TECHNICAL FIELD

The present disclosure relates to a laminated core constituting a stator.

BACKGROUND

A laminated core is a component of a motor and is formed by laminating a plurality of electromagnetic steel plates (processed bodies) processed in a predetermined shape and fastening these steel plates. The motor includes a rotor and a stator formed as a laminated core and is obtained by attaching a shaft to the rotor and winding a coil around the stator. The plurality of electromagnetic steel plates constituting the laminated core of the stator can be obtained by punching, for example, a plate-like stator material (a workpiece plate) using a die (for example, see Japanese Unexamined Patent Publication No. 2005-198361).

SUMMARY

The laminated core of the stator may be formed in a rectangular shape in plan view in response to the arrangement of slots. In this case, the electromagnetic steel plate is formed in a rectangular shape. Here, when the electromagnetic steel plate is formed in a rectangular shape, a balance of stress inside the electromagnetic steel plate generated by punching becomes poor as compared with a case in which the electromagnetic steel plate is formed in a square shape. Accordingly the electromagnetic steel plate may become deformed so that the performance of the stator is deteriorated.

Disclosed herein is a method of manufacturing a laminated core constituting a stator capable of suppressing deterioration of performance of a stator due to deformation of an electromagnetic steel plate (a processed body).

The method of manufacturing a laminated core of a stator may include supplying a workpiece plate to a die, obtaining a rectangular processed body by punching the workpiece plate using the die, and obtaining a laminated core by laminating and fastening a plurality of the processed bodies. In some examples, the laminated core may be obtained by a slit forming step of forming a slit outside a processed body forming area corresponding to an area formed as the processed body in the workpiece plate along a long side of the processed body forming area. Additionally, the laminated core may be obtained by an inner diameter removal step of punching a center portion of the processed body forming area in a circular shape, and a processed body removal step of punching the processed body forming area after the slit forming step and the inner diameter removal step.

Accordingly a deterioration of performance of the stator due to the deformation of the electromagnetic steel plate (the processed body) may be suppressed.

DETAILED DESCRIPTION

In the following description, with reference to the drawings, the same reference numbers are assigned to the same components or to similar components having the same function, and overlapping description is omitted.

An example method of manufacturing a laminated core of a stator may include supplying a workpiece plate to a die, obtaining a rectangular processed body by punching the workpiece plate using the die, and obtaining a laminated core by laminating and fastening a plurality of the processed bodies. In some examples, the laminated core may be obtained by a slit forming step of forming a slit outside a processed body forming area corresponding to an area formed as the processed body in the workpiece plate along a long side of the processed body forming area. Additionally, the laminated core may be obtained by an inner diameter removal step of punching a center portion of the processed body forming area in a circular shape, and a processed body removal step of punching the processed body forming area after the slit forming step and the inner diameter removal step.

In some examples, the rectangular processed body is obtained by punching the processed body forming area after forming the rotor arrangement area at the center portion of the processed body forming area. Here, for example, there is a case in which the laminated cores of the stator are arranged so that the slots face each other in one direction. In order to increase the slot forming area (an area facing in one direction), the processed body is formed in a rectangular shape. Even when the processed body is formed in a rectangular shape, the rotor arrangement area (the center portion of the processed body forming area) is generally formed in a substantially circular shape. For this reason, the processed body is provided with a narrow area an area along a long side) and a wide area (which is a slot forming area and an area along a short side). Accordingly, since a balance of stress generated in the processed body forming area due to the punching of the processed body forming area becomes poor, deformation may occur in the narrow area (an area along a long side). For example, the narrow area (an area along a long side) may be deformed toward the center portion (the rotor arrangement area) which is punched in advance at the time of punching the processed body forming area.

Additionally, the slit may be formed outside the processed body forming area along the long side of the processed body forming area in a step before the processed body forming area is punched. Accordingly, since the processed body removal step is performed while the inside (an area punched as the rotor arrangement area) and the outside (an area provided with the slit) of the narrow area (an area along a long side) are all punched, the deformation of the narrow area (an area along a long side) in a specific direction (for example, an inward direction) may be suppressed. As described above, a deterioration of performance of the stator due to the deformation of the processed body may similarly be suppressed.

In some examples, the inner diameter removal step may be performed after the slit forming step. As described above, since the deformation of the processed body due to the punching is suppressed by forming the slit, an effect of suppressing the deformation of the processed body due to the formation of the slit may also be achieved in the inner diameter removal step by forming the slit before the inner diameter removal step, and before the processed body removal step. Accordingly, a deformation of the processed body may be suppressed by performing the inner diameter removal step as well as the processed body removal step by adjusting, for example, the length or width of the slit.

In some examples, the center portion may be punched while a reinforcement member is inserted into the slit in the inner diameter removal step. When the slit is formed before the inner diameter removal step, there is concern that an area along a long side of the processed body forming area may be deformed toward the slit forming area side (the outside) in the inner diameter removal step. Since the reinforcement member is inserted into the slit in the inner diameter removal step, the deformation of an area along a long side toward the slit forming area side (the outside) may rarely occur even in the inner diameter removal step. That is, a deterioration of performance of the stator due to the deformation of the processed body may be suppressed by inserting the reinforcement member into the slit.

In some examples, the slit having five or more sides in plan view may be formed in the slit forming step. When the slit is formed by the punching of the die, there is a case in which a part (scrap) once punched out by the punching of the die passes through the slit again and returns to the surface of the processed body forming area. Since the scrap returns from the slit to the surface of the processed body forming area, this may influence a subsequent step of laminating the processed bodies. In contrast, since the slit is formed in a complex shape having five or more sides in plan view, the scrape may rarely pass through the slit and hence an influence on the step of laminating the processed bodies can be suppressed.

Laminated Core

Figure 1:
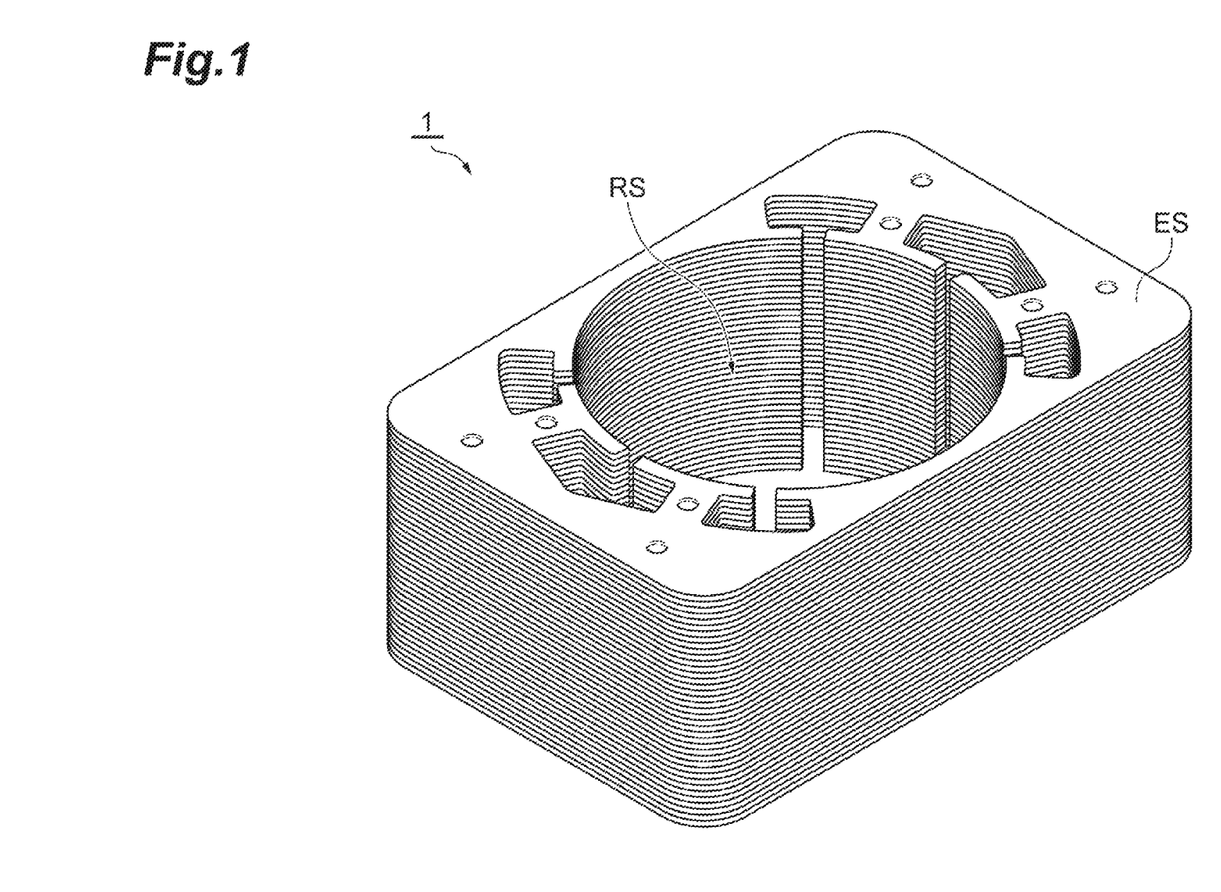
FIG. 1 is a perspective view illustrating an example of a laminated core constituting a stator.
Figure 2:
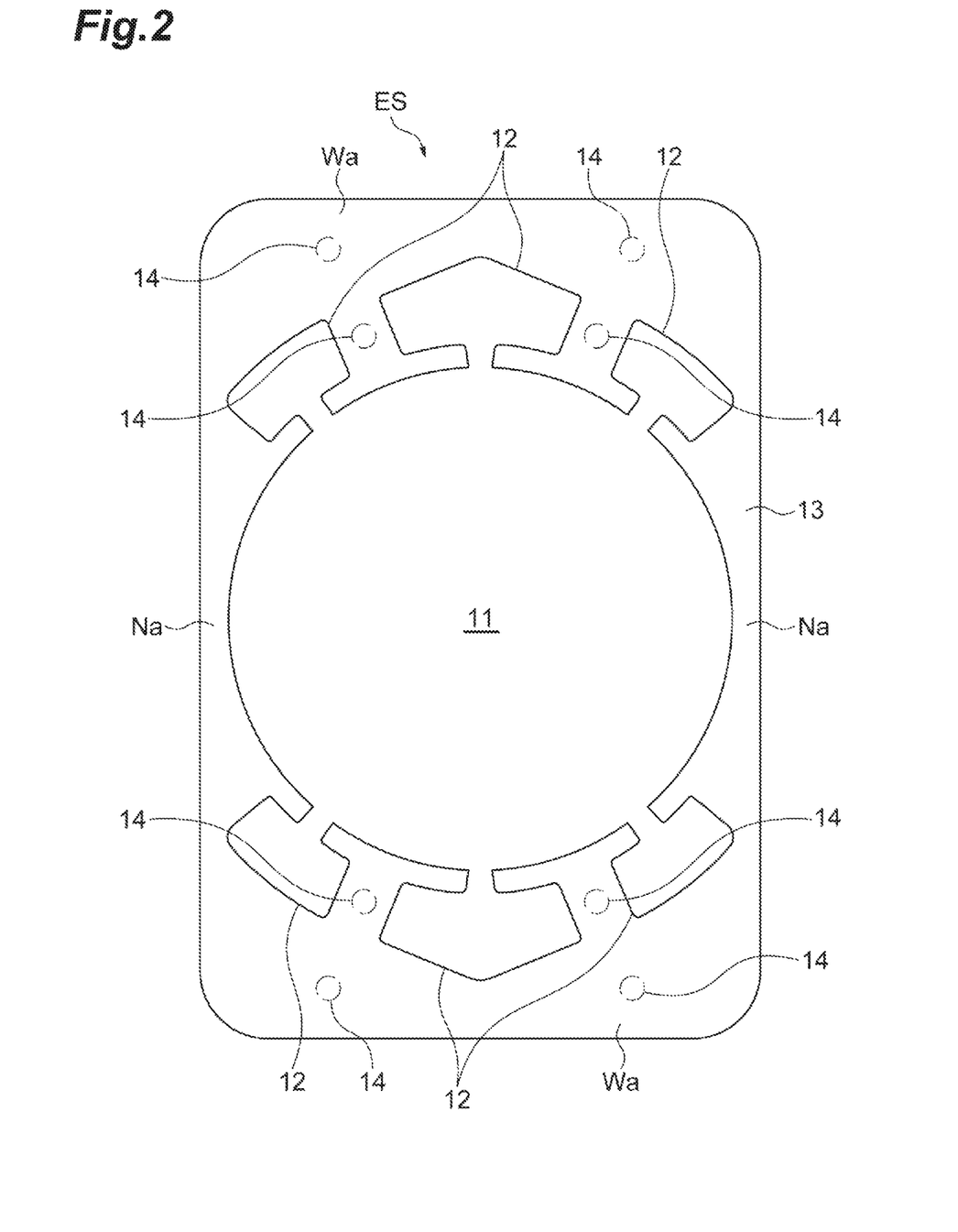
FIG. 2 is a plan view illustrating a processed body included in the laminated core illustrated in FIG. 1.

A configuration of a laminated core 1 will be described with reference to FIGS. 1 and 2. The laminated core 1 is a part of a stator. The stator has a configuration in which a wound wire is attached to the laminated core 1. By the combination of a stator and a rotor, a motor is obtained. The laminated core 1 has a substantially rectangular tubular shape and a rotor arrangement space RS is formed at a center portion.

Figure 3:
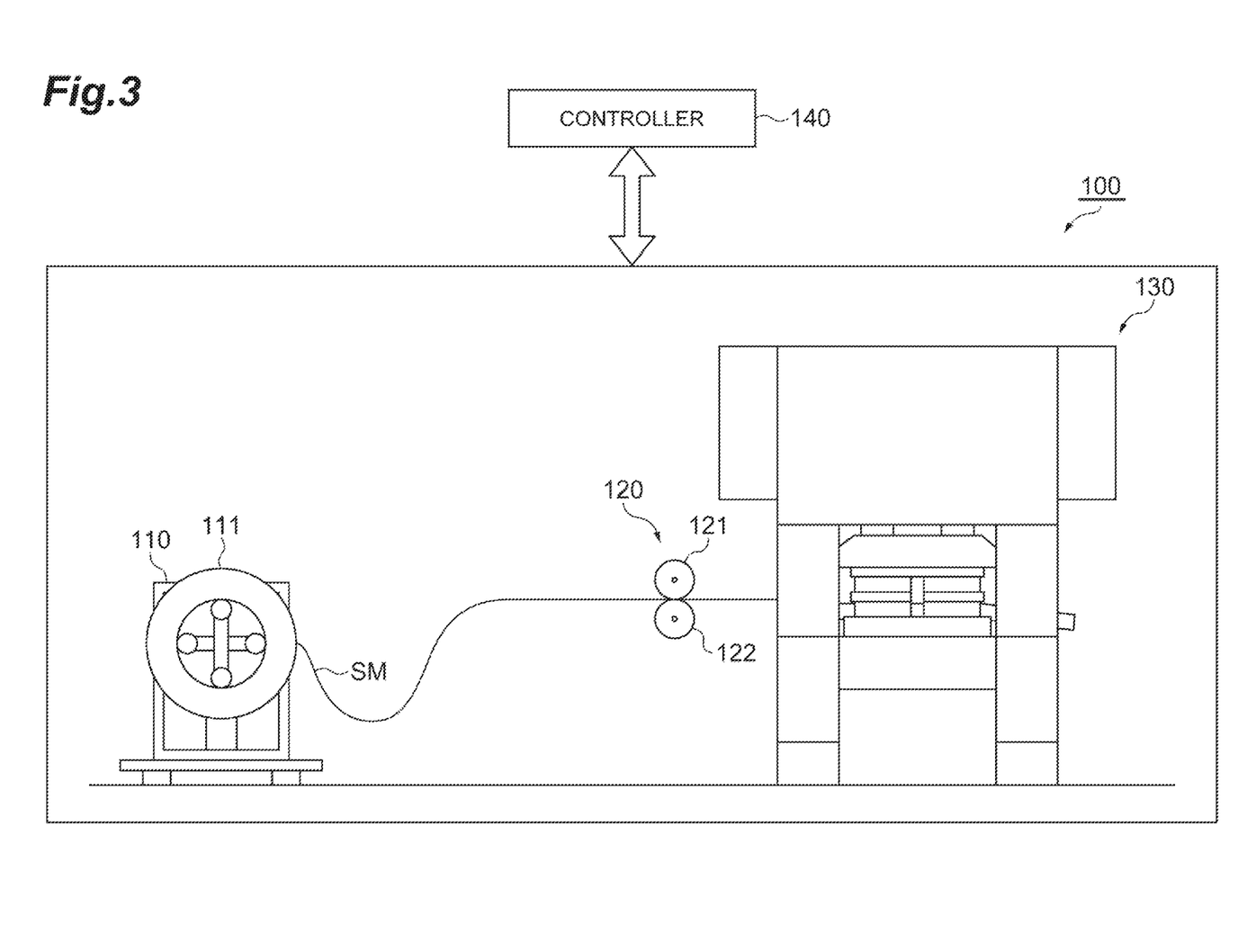
FIG. 3 is a schematic diagram illustrating an example of a punching device.

The laminated core 1 is formed by laminating a plurality of electromagnetic steel plates ES (processed bodies). As illustrated in FIG. 3, the electromagnetic steel plate ES can be obtained from the stator material SM (the workpiece plate) by a punching operation using the die to be described later. The electromagnetic steel plate ES has a substantially rectangular shape in plan view and includes an opening 11, a slot 12, a yoke portion 13, and a joint portion 14.

The opening 11 is an opening area having a circular shape in plan view and formed at the center portion of the electromagnetic steel plate ES by punching. An area of the center portion provided with the opening 11 in an area along a long side of the electromagnetic steel plate ES is formed as a narrow area Na having a narrow width. In contrast, an area along a short side of the electromagnetic steel plate ES is formed as an area for forming the slot 12 and is formed as a wide area Wa having a width wider than that of the narrow area Na.

The slot 12 is a space which is formed in the periphery of the opening 11 by punching to dispose a wound wire (not illustrated) therein. The electromagnetic steel plate ES includes a plurality of slots 12 and six slots 12 are provided in the example illustrated in FIG. 2. Six slots 12 are formed such that a half (three) of them are formed at each of both end portions of the electromagnetic steel plate ES in the longitudinal direction. That is, six slots 12 are formed along the short side of the electromagnetic steel plate ES so that three slots face in the longitudinal direction of the electromagnetic steel plate ES.

The yoke portion 13 is provided in the entire electromagnetic steel plate ES including the narrow area Na and the wide area Wa. A portion on which a coil is wound in the yoke portion 13 serves as a tooth. The width and the thickness of the yoke portion 13 can be set variously in response to the application and the performance of the motor.

The joint portion 14 is a portion that joins the electromagnetic steel plates ES overlapping in the vertical direction. A plurality of (in the example illustrated in FIG. 2, two) joint portions 14 are formed in the vicinity of each of four corners of the electromagnetic steel plate ES. The joint portion 14 forms a concave portion on the front surface (the upper surface) of the electromagnetic steel plate ES and forms a convex portion on the rear surface (the lower surface). In the laminated core 1, the upper and lower electromagnetic steel plates ES are fastened to each other in such a manner that the rear surface (the convex portion) of the upper electromagnetic steel plate ES is fitted to the front surface (the concave portion) of the lower electromagnetic steel plate ES. Furthermore, in order to prevent the plurality of laminated cores 1 from being fastened to each other, the joint portion 14 is formed as a perforation hole instead of the convex portion and the concave portion in the electromagnetic steel plate ES located at the lowest portion of the laminated structure.

In some examples, the laminated core 1 is formed by laminating the electromagnetic steel plates ES and fastening these steel plates by caulking, but other methods of fastening the electromagnetic steel plates ES may be used. For example, the plurality of electromagnetic steel plates ES may be fastened by welding, adhering, or a resin material. From the viewpoint of cost and working efficiency, caulking and welding may be used. Meanwhile, when priority is given to high motor torque and low iron loss, a resin material or adhesive may be used instead of caulking or welding. Further, the laminated core 1 may be obtained by providing temporary caulking on the electromagnetic steel plate ES, fastening the electromagnetic steel plates ES to each other, and finally removing the temporary caulking from a laminated structure. Furthermore, the "temporary caulking" means caulking which is used to temporarily integrate a plurality of processed bodies manufactured by punching and is removed during the manufacturing of a product (laminated core).

Apparatus for Manufacturing Laminated Core

Next, an apparatus 100 for manufacturing the laminated core 1 will be described with reference to FIG. 3.

The manufacturing apparatus 100 is an apparatus which manufactures the laminated core 1 from the stator material SM (the workpiece plate) which is a belt-like metal plate. The manufacturing apparatus 100 includes an uncoiler 110, a delivery device 120, a punching device 130 (a die), and a controller 140.

The uncoiler 110 holds the coil material 111 in a rotatable state while the coil material 111 corresponding to the belt-like stator material SM wound in a coil shape is attached. The delivery device 120 includes a pair of rollers 121 and 122 which sandwiches the stator material SM from above and below. The pair of rollers 121 and 122 rotates and stops based on a command signal from the controller 140 and intermittently and sequentially delivers the stator material SM toward the punching device 130 in one direction.

The length of the stator material SM forming the coil material 111 may be, for example, approximately 500 m to 10000 m. The thickness of the stator material SM may be, for example, approximately 0.1 mm to 0.5 mm. The thickness of the stator material SM may be, for example, approximately 0.1 mm to 0.3 mm from the viewpoint of obtaining the laminated core 1 having more excellent magnetic characteristics. The width of the stator material SM may be, for example, approximately 50 mm to 500 mm.

Figure 4:
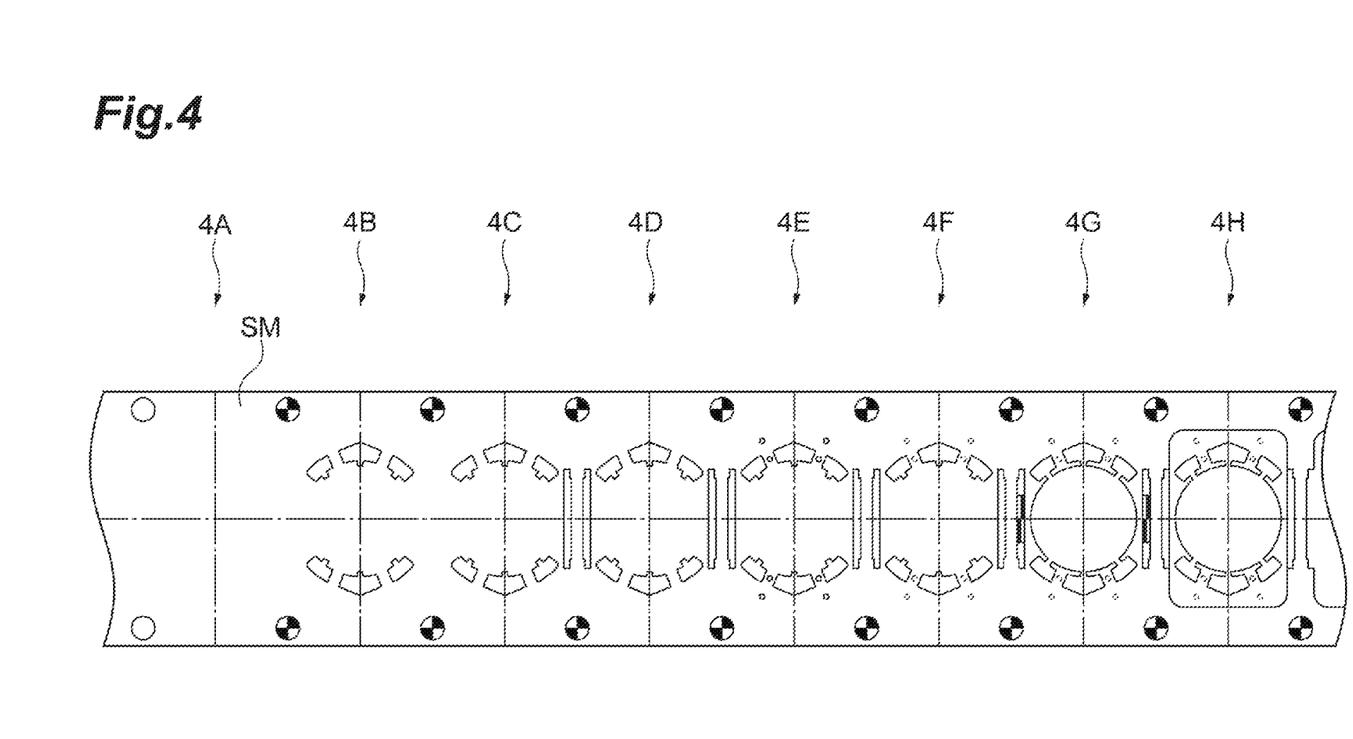
FIG. 4 is a plan view illustrating a belt-like stator material including a plurality of layouts 4A to 4H.

The punching device 130 is operated based on a command signal from the controller 140. The punching device 130 has a function of forming the electromagnetic steel plate ES (the processed body) by sequentially punching the stator material SM intermittently delivered by the delivery device 120 and a function of manufacturing a laminated structure 2 (see FIG. 1) by sequentially laminating the electromagnetic steel plate ES obtained by punching. The punching device 130 may include, for example, a pilot punch which punches a pilot hole P (which will be described later in detail), a slot punch which punches the slot 12, a slit punch which punches the slit 50 (which is illustrated in FIG. 4 and will be described later in further detail), an inner diameter punch which punches the opening 11, an outer diameter punch which punches the processed body forming area Ma (which will be described later in further detail), and a pilot pin.

The controller 140 generates command signals for operating the delivery device 120 and the punching device 130 based on, for example, a program stored in a recording medium (not illustrated) or an operation input from an operator and transmits the command signals to the delivery device 120 and the punching device 130.

Method of Manufacturing Laminated Core

Next, a method of manufacturing the laminated core 1 will be described. The laminated core 1 is manufactured through a process (step (A) and step (B) described below) of manufacturing the electromagnetic steel plate ES corresponding to the processed body and a process (step (C) described below) of manufacturing the laminated core 1 from the plurality of electromagnetic steel plates ES. In some examples, the method of manufacturing the laminated core 1 includes the following steps:

Step (A)—sequentially supplying the stator material SM corresponding to the workpiece plate to the punching device 130 corresponding to the die (step of supplying the workpiece plate to the die)

Step (B)—obtaining the electromagnetic steel plate ES corresponding to the rectangular processed body by punching the stator material SM using the punching device 130 (step of obtaining the processed body)

Step (C)—obtaining the laminated core 1 by laminating the electromagnetic steel plates ES and fastening these steel plates (step of obtaining the laminated core)

In the example method of manufacturing the laminated core 1, first, a belt-like coil material 111 wound in a coil shape is prepared and is attached to the uncoiler 110. At step A, the stator material SM (the workpiece plate) drawn from the coil material 111 is supplied to the punching device 130.

At step B, the rectangular electromagnetic steel plate ES (the processed body) provided with the opening 11, the slot 12, and the joint portion 14 is continuously manufactured by punching the stator material SM in the punching device 130. In step (B), the stator material SM is punched by various punches of the punching device 130 to obtain the electromagnetic steel plate ES. Step (B) may include the following steps identified as step (b-0) through step (b-5). In some examples, the steps may be sequentially performed in the order provided below. For example, the processed body removal step is performed after the slit forming step and the inner diameter removal step to be described later. Further, the inner diameter removal step is performed after the slit forming step.

Step (b-0)—forming the pilot hole P in the stator material SM

Step (b-1)—forming the slot 12 at both end portions in the longitudinal direction of the processed body forming area Ma corresponding to an area formed as the electromagnetic steel plate ES in the stator material SM Step (b-2)—forming the slit 50 outside the processed body forming area Ma along a long side of the processed body forming area Ma (the slit forming step)

Step (b-3)—forming the joint portion 14 at four corners of the processed body forming area Ma Step (b-4)—forming the opening 11 by punching the center portion of the processed body forming area Ma in a circular shape (the inner diameter removal step)

Step (b-5)—punching the processed body forming area Ma (the processed body removal step)

Figure 5:
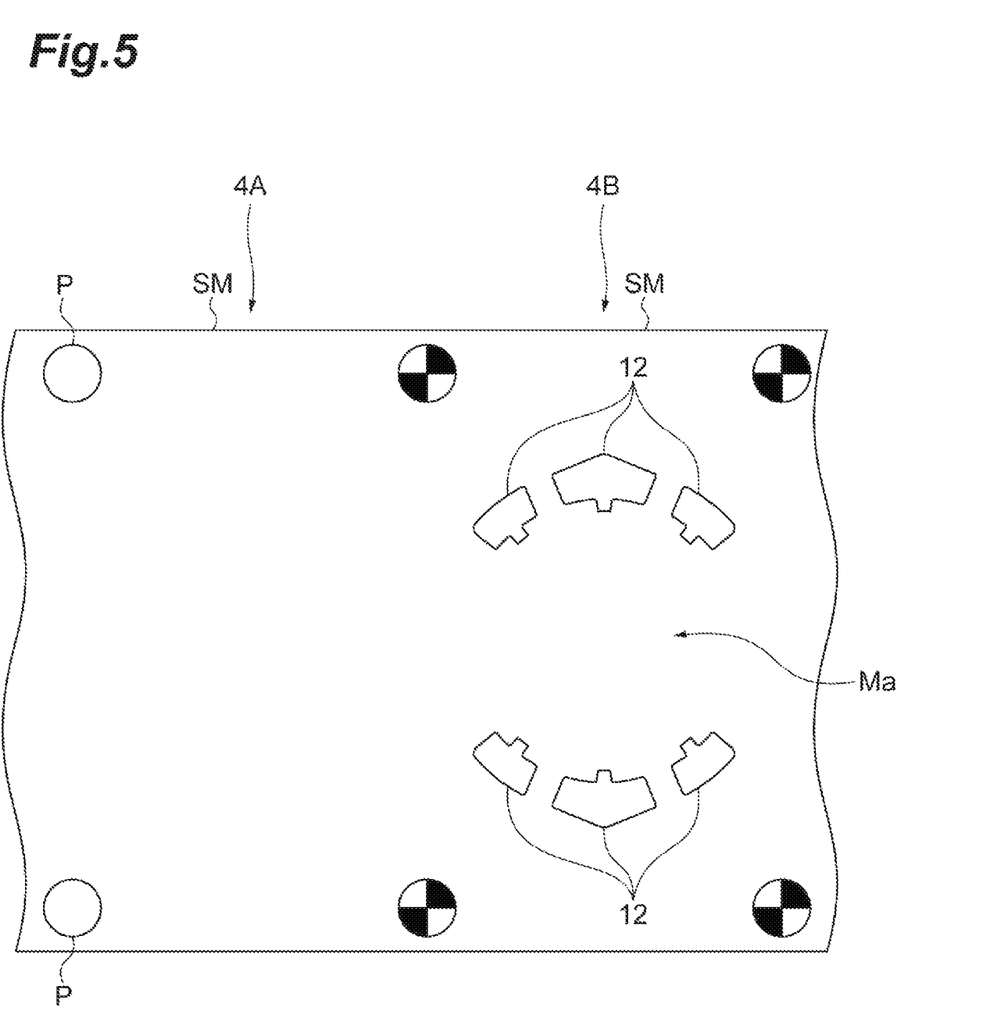
FIG. 5 is an enlarged view of the layouts 4A and 4B illustrated in FIG. 4.
Figure 6:
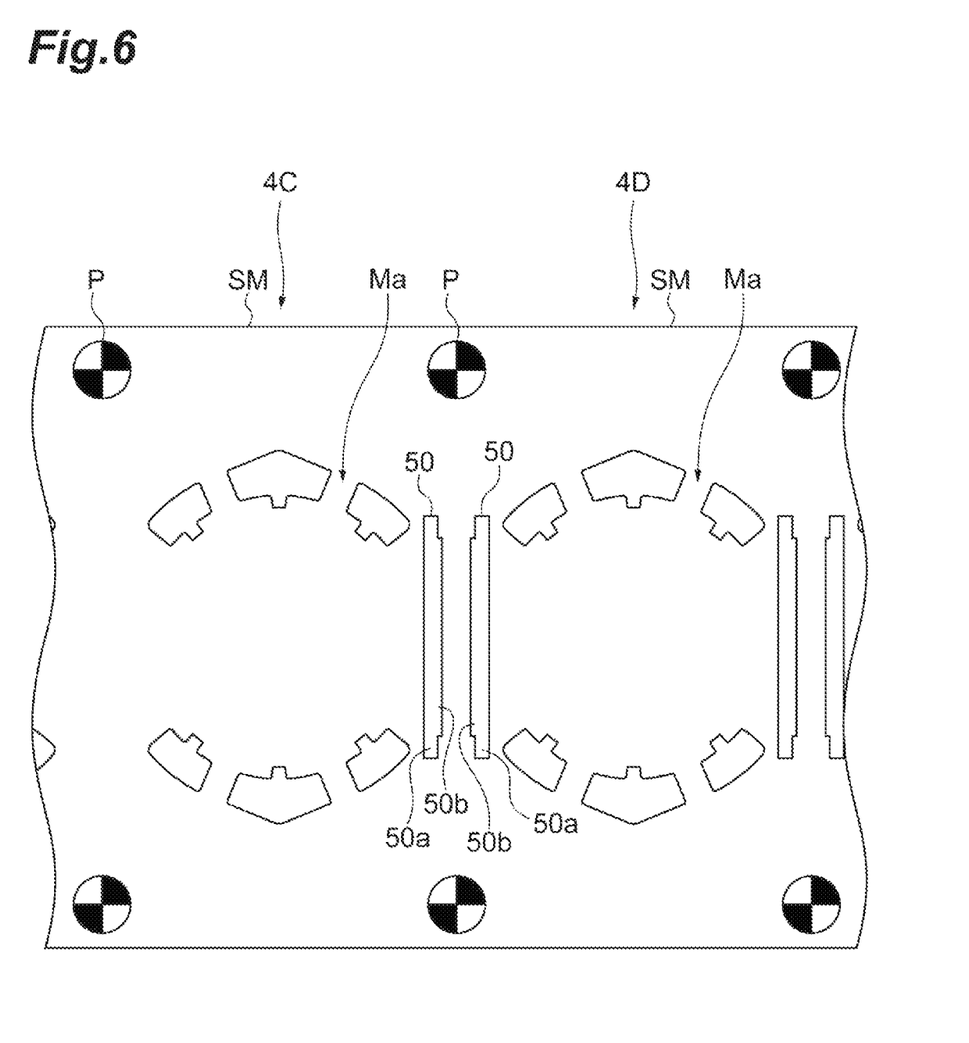
FIG. 6 is an enlarged view of the layouts 4C and 4D illustrated in FIG. 4.
Figure 7:
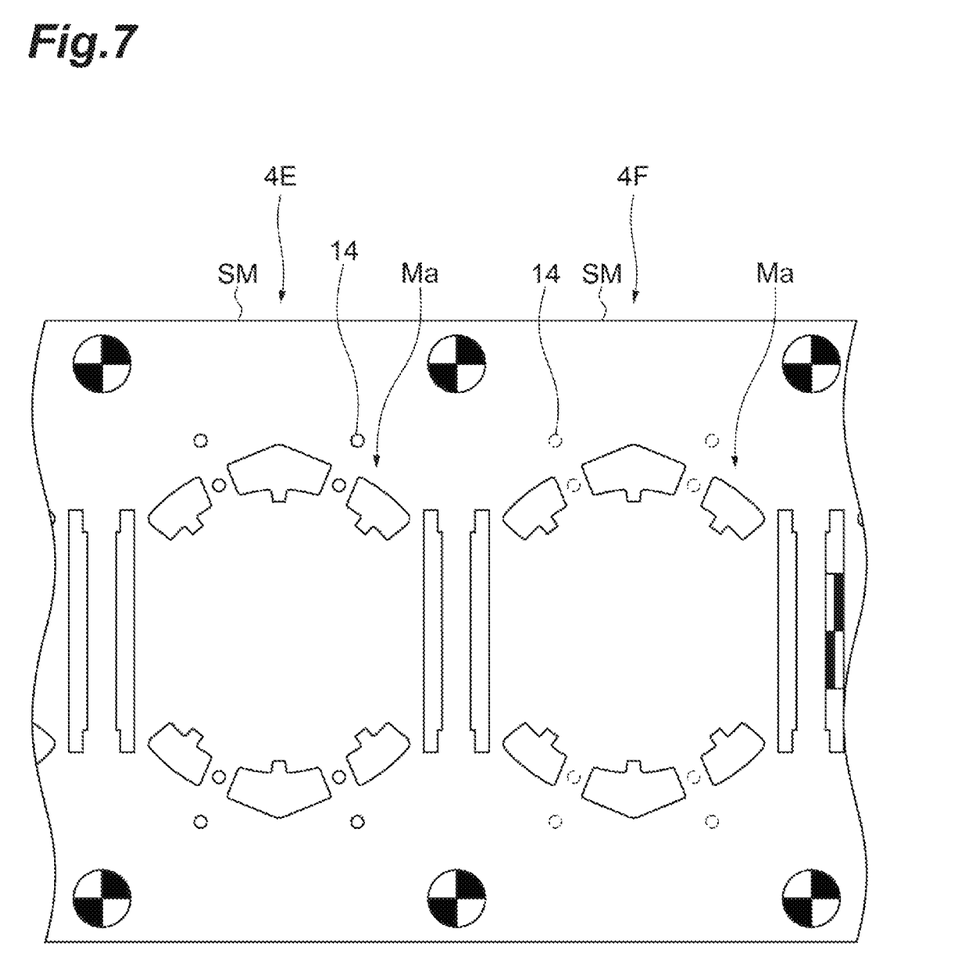
FIG. 7 is an enlarged view of layouts 4E and 4F illustrated in FIG. 4.
Figure 8:
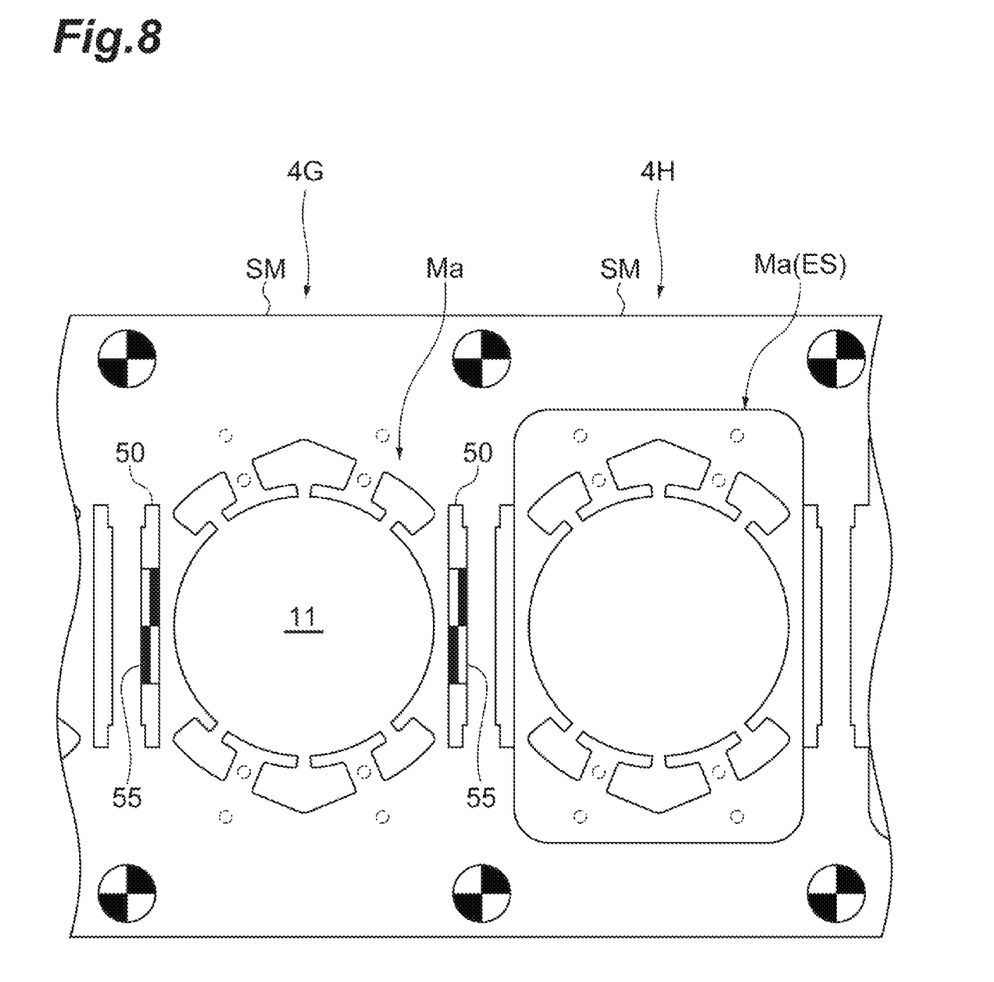
FIG. 8 is an enlarged view of layouts 4G and 4H illustrated in FIG. 4.

Referring to FIGS. 4 to 8, step (B) will be described in further detail. FIG. 4 is a plan view illustrating a belt-like stator material SM including a plurality of layouts. FIG. 5 is an enlarged view of the layouts 4A and 4B illustrated in FIG. 4. FIG. 6 is an enlarged view of the layouts 4C and 4D illustrated in FIG. 4. FIG. 7 is an enlarged view of layouts 4E and 4F illustrated in FIG. 4. FIG. 8 is an enlarged view of layouts 4G and 4H illustrated in FIG. 4.

Step (b-0) is a step of forming the pilot hole P at both end portions of the belt-like stator material SM in the width direction (see layout 4A). The pilot hole P is a hole into which the pilot pin for positioning the stator material SM during the punching is inserted. In step (b-0), the pilot punch of the punching device 130 punches both end portions of the stator material SM in the width direction to simultaneously form two pilot holes P.

Step (b-1) is a step of forming the slot 12 at both end portions in the longitudinal direction of the processed body forming area Ma corresponding to an area formed as the electromagnetic steel plate ES (the electromagnetic steel plate ES is obtained by punching). As illustrated in layout 4B, six slots 12 are formed by punching six positions (three positions of each of both end portions) at both end portions in the longitudinal direction of the processed body forming area Ma using the slot punch of the punching device 130 while the pilot pins are inserted into four pilot holes P formed to surround the processed body forming area Ma so that the stator material SM is fixed.

Step (b-2) is a step of forming the slit 50 outside the processed body forming area Ma along a long side of the processed body forming area Ma (see layouts 4C and 4D). In step (b-2), first, the slit 50 is formed on one long side of the processed body forming area Ma (see layout 4C) and then the slit 50 is formed on the other long side of the processed body forming area Ma (see layout 4D). In step (b-2), the slit 50 is formed outside of the two long sides by punching the outside of the two long sides of the processed body forming area Ma using the slit punch of the punching device 130 while the pilot pin is inserted into four pilot holes P formed to surround the processed body forming area Ma so that the stator material SM is fixed.

Figure 9:
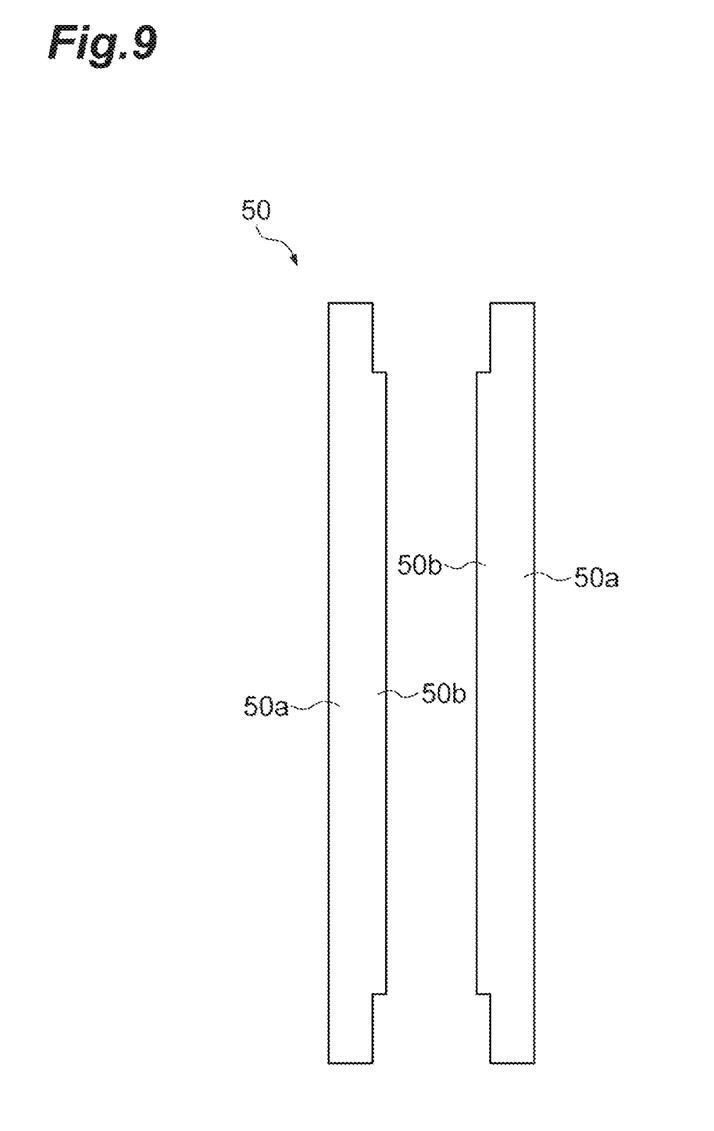
FIG. 9 is a plan view illustrating an example of a slit.
Figure 10A:
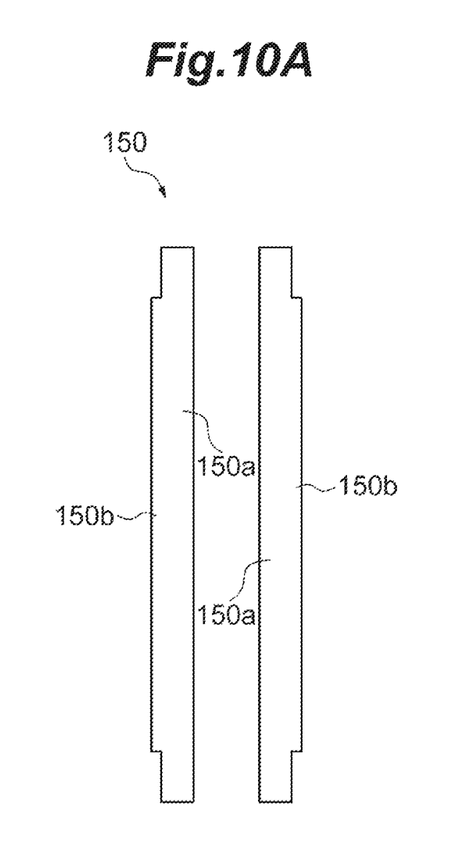
FIGS. 10A to 10C are plan views illustrating other example slits.
Figure 10B:
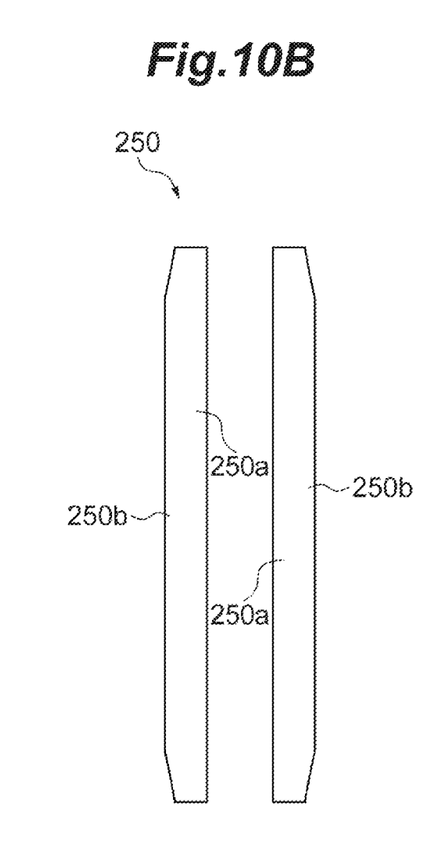
Figure 10C:
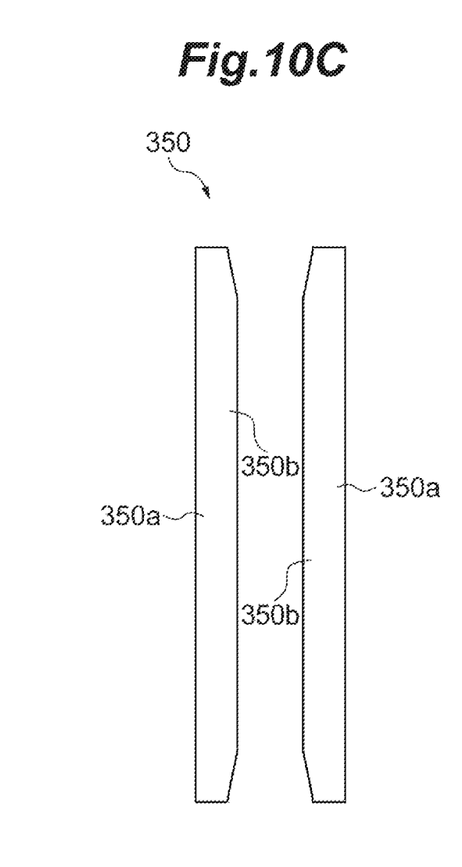

In step (b-2), the slit 50 having five sides or more in plan view is formed. In some examples, the slit 50 may have eight sides in plan view, as illustrated in layouts 6A and 6B, and in FIG. 9. The slit 50 includes a first area 50a which is formed in a region close to the processed body forming area Ma. Additionally, the slit may have a length in the longitudinal direction substantially the same as the diameter of the opening 11 to be described later. Still further, the slit may be formed in a rectangular shape in plan view. In some examples, a second area 50b which is continuous to the first area 50a in the width direction of the processed body forming area Ma so as to interpose the first area 50a between the processed body forming area Ma and the second area, is formed to have a length in the longitudinal direction shorter than that of the first area. In some examples, each of the first area 50a and the second area 60b may be formed in a rectangular shape in plan view (see FIG. 9). The first area 50a and the second area 50b are integrally formed with each other by the slit punch. In this way, the slit 50 in which the first area 50a and the second area 50b having a rectangular shape in plan view are continuously formed in the width direction has eight sides in plan view as described above. Furthermore, the slit 50 may be formed so that at least a part thereof is formed outside the processed body forming area Ma and may have, for example, an area inside the processed body forming area Ma. Further, the slit 50 may have five or more sides in plan view instead of eight sides, and as further discussed herein (e.g., see FIGS. 10A to 10C).

Step (b-3) is a step of forming a plurality of (for example, two) joint portions 14 in the vicinity of four corners of the processed body forming area Ma (see layouts 4E and 4F). In some examples, only the electromagnetic steel plate ES located at the lowest portion is formed so that the joint portion 14 is punched and the joint portions 14 of the other electromagnetic steel plates ES are formed in a shape in which the front surface forms a concave portion and the rear surface forms a convex portion. For this reason, there may be a difference in process depending on whether step (b-3) is a step involving the electromagnetic steel plate ES of the lowest layer.

In step (b-3) involving the electromagnetic steel plate ES of the lowest layer, the joint portion 14 corresponding to a perforation hole is formed by punching an area (totally twelve areas) corresponding to the joint portion 14 in the vicinity of four corners of the processed body forming area Ma using the punch of the punching device 130 while the pilot pin is inserted into four pilot holes P formed to surround the processed body forming area Ma so that the stator material SM is fixed (see layout 4E). Meanwhile, in step (b-3) involving the electromagnetic steel plate ES other than the lowest layer, the joint portion 14 forming a concave portion on the front surface and a convex portion on the rear surface is formed by pressing an area (totaling twelve areas) corresponding to the joint portion 14 in the vicinity of four corners of the processed body forming area Ma using the punch of the punching device 130 while the pilot pin is inserted into four pilot holes P formed to surround the processed body forming area Ma so that the stator material SM is fixed (see layout 4F).

Step (b-4) is a step of forming the opening 11 by punching the center portion of the processed body forming area Ma in a circular shape (see layout 4G). In step (b-4), the inner diameter punch of the punching device 130 punches the center portion of the processed body forming area Ma in a circular shape while the pilot pin is inserted into four pilot holes P formed to surround the processed body forming area Ma so that the stator material SM is fixed and the pilot pin 55 (the reinforcement member) is inserted into two slits 50. Accordingly, the circular opening 11 is formed at the center portion of the processed body forming area Ma. In this way, in the inner diameter removal step, the opening 11 is formed by punching the center portion while the pilot pin 55 is inserted into the slit 50. The opening 11 is formed in, for example, a circular shape. Furthermore, the pilot pin 55 inserted into the slit 50 may be inserted into, for example, only the center portion of the slit 50 in the longitudinal direction. In other examples, the pilot pin 55 may be inserted into an area corresponding to the length of the second area 50b in the longitudinal direction. In still other examples, the pilot pin 55 may be inserted into the entire area of the slit 50 to correspond to the length of the first area 50a in the longitudinal direction. Further, a member other than the pilot pin 55 (for example, a pin-like member capable of filling a space of the slit 50) may be inserted into the slit 50 as a reinforcement member.

Step (b-5) is a step of punching the processed body forming area Ma (see layout 4H). In step (b-5), the electromagnetic steel plate ES corresponding to the rectangular processed body can be obtained by punching the processed body forming area Ma using the outer diameter punch of the punching device 130 while the pilot pin is inserted into four pilot holes P formed to surround the processed body forming area Ma so that the stator material SM is fixed.

Then, the laminated core 1 can be obtained by laminating a predetermined number of electromagnetic steel plates ES obtained through step (b-1) to step (b-5) and fastening these steel plates by caulking (step (C)).

Next, an example method of manufacturing the laminated core 1 constituting the stator will be described.

The example method of manufacturing may include supplying the stator material SM corresponding to the workpiece plate to the punching device 130, and obtaining the electromagnetic steel plate ES corresponding to the rectangular processed body by punching the stator material SM using the punching device 130. Additionally, the method may comprise obtaining the laminated core 1 by laminating the electromagnetic steel plates ES and fastening these steel plates. The process of obtaining the electromagnetic steel plate ES may include a slit forming step of forming the slit 50 outside the processed body forming area Ma along a long side of the processed body forming area Ma corresponding to an area formed as the processed body in the stator material SM. Additionally, the process of obtaining the electromagnetic steel plate ES may include an inner diameter removal step of punching the center portion of the processed body forming area Ma in a circular shape, and a processed body removal step of punching the processed body forming area Ma after the slit forming step and the inner diameter removal step.

In some examples, the rectangular electromagnetic steel plate ES is obtained by punching the processed body forming area Ma after the opening 11 corresponding to the rotor arrangement area is formed at the center portion of the processed body forming area Ma. The laminated core of the stator may be disposed so that, for example, the slot faces one direction. In order to increase an area provided with the slot (an area facing in one direction), the processed body forming area Ma may be formed in a rectangular shape. When the processed body forming area Ma is formed in a rectangular shape, the rotor arrangement area (the center portion of the processed body forming area) is generally formed in a circular shape. The processed body may provided with the narrow area Na (an area along a long side) and the wide area Wa (an area which is provided with the slot and is formed along a short side). If an imbalanced amount of stress is generated in the processed body forming area Ma due to the punching of the processed body forming area Ma, the narrow area Na (an area along a long side) may become deformed. For example, the narrow area Na (an area along a long side) may become deformed toward the opening 11 (the rotor arrangement area) which is punched in advance at the time of punching the processed body forming area Ma.

In some examples, the slit 50 is formed outside the processed body forming area Ma along a long side of the processed body forming area Ma in a step before the processed body forming area Ma is punched. Accordingly, since the processed body removal step is performed while the inside (an area provided with the opening 11) and the outside (an area provided with the slit 50) of the narrow area Na (an area along a long side) are all punched, a deformation of the narrow area Na (an area along a long side) may be suppressed in a specific direction (for example, an inward direction). Therefore, a deterioration of performance of the stator due to the deformation of the processed body may be avoided.

In some examples, the inner diameter removal step (the step of forming the opening 11) is performed after the slit forming step. Since the deformation of the processed body due to the punching is suppressed by forming the slit 50, the deformation of the processed body due to the formation of the slit 50 may also be suppressed in the inner diameter removal step by forming the slit before the inner diameter removal step, and before the processed body removal step. Accordingly, a deformation of the processed body may be suppressed by performing the inner diameter removal step as well as the processed body removal step by adjusting, for example, the length or width of the slit.

In some examples, the center portion is punched While the reinforcement member such as the pilot pin 55 is inserted into the slit 50 in the inner diameter removal step. When the slit 50 is formed before the inner diameter removal step, an area along a long side (that is, an inner area of the slit 50) of the processed body forming area Ma may be deformed toward the area of forming the slit 50 (the outside) in the inner diameter removal step. If the inner diameter removal step is performed while the reinforcement member such as the pilot pin 55 is inserted into the slit 50, an outward deformation of an area along a long side of the processed body forming area Ma may be suppressed even in the inner diameter removal step. Therefore, when the reinforcement member is inserted into the slit 50, a deterioration of performance of the stator due to the deformation of the processed body may be avoided.

In some examples, in the slit forming step, the slit 50 having five or more sides (for example, eight sides) in plan view is formed. When the slit 50 is formed by the punching of the punching device 130, a part (scrap) once punched out by the punching of the punch may pass through the slit again and return to the surface of the processed body forming area Ma (raising of scrap occurs). If the scrap returns from the slit 50 to the surface of the processed body forming area Ma, this could affect a subsequent step of laminating the processed bodies. However, by forming the slit 50 in a complex shape having five or more sides, the scrap may rarely pass through the slit 50. Thus, an effect of the resulting scrap on the step of laminating the processed bodies can be avoided. Furthermore, since the center portion of the slit 50 may become deformed, the center portion of the slit 50 may be formed to be wider than the other portions so that the reinforcement member is easily inserted into the center portion of the slit 50. The example method of manufacturing the laminated core 1 has referred to slit 50 illustrated in FIG. 9, however other example slits may also be used, such as slits 150, 250, and 350 illustrated in FIGS. 10A to 10C. The slit 150 illustrated in FIG. 10A has eight sides in plan view similarly to the slit 50, and includes a first area 150a which is formed to have a length which is substantially equal to the diameter of the opening 11 and is formed in a rectangular shape in plan view. Additionally, the slit 150 includes a second area 150b which is continuous (adjacent) to the first area 150a in the width direction of the processed body forming area Ma, is formed to be shorter than the first area in the longitudinal direction, and is formed in a rectangular shape in plan view. The slit 150 is different from the slit 50 in that the second area 150b which is shorter in the longitudinal direction is formed nearer the processed body forming area Ma in relation to the first area 150a (in the slit 50, the first area 50a which is longer in the longitudinal direction is formed nearer the processed body forming area Ma in relation to the second area 50b). The slit 250 illustrated in FIG. 10B has six sides in plan view and includes a first area 250a which is formed to have a length which is substantially equal to the diameter of the opening 11 and is formed in a rectangular shape in plan view. Additionally, the slit includes a second area 250b which is continuous (adjacent) to the first area 250a in the width direction of the processed body forming area Ma and is formed in a trapezoidal shape in plan view such that a side continuous to the first area 250a is a long side, and a side that is not continuous to the first area 250a is a short side. The slit 350 illustrated in FIG. 10C, has six sides similarly to the slit 250 and includes a first area 350a which is formed to have a length which is substantially equal to the diameter of the opening 11 and is formed in a rectangular shape in plan view. Additionally, the slit includes a second area 350b which is continuous (adjacent) to the first area 350a in the width direction of the processed body forming area Ma and is formed in a trapezoidal shape in plan view such that a side continuous to the first area 350a is a long side, and a side that is not continuous to the first area 350a is a short side. The slit 350 is different from the slit 250 in that the first area 350a having a rectangular shape in plan view is formed near the processed body forming area Ma in relation to the second area 350b having a trapezoidal shape in plan view (in the slit 250. Additionally, the second area 250b having a trapezoidal shape in plan view is formed near the processed body forming area Ma in relation to the first area 250a having a rectangular shape in plan view).

It is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

What is claimed is:

1. A method of manufacturing a laminated core comprising:
   supplying a workpiece plate to a die;
   obtaining a rectangular processed body by punching the workpiece plate using the die; and
   obtaining a laminated core by laminating and fastening a plurality of processed bodies,
   wherein obtaining the rectangular processed body includes:
      a slit forming step of forming a slit outside a processed body forming area in the workpiece plate along a long side of the processed body forming area, wherein the processed body forming area corresponds to an area formed as the processed body;
      an inner diameter removal step of punching a center portion of the processed body forming area in a circular shape; and
      a processed body removal step of punching the processed body forming area after the slit forming step and the inner diameter removal step, and
   wherein in the slit forming step, the slit having six or more sides in plan view is formed.

2. A method of manufacturing a laminated core comprising:
   supplying a workpiece plate to a die;
   obtaining a rectangular processed body by punching the workpiece plate using the die; and
   obtaining a laminated core by laminating and fastening a plurality of processed bodies,
   wherein obtaining the rectangular processed body includes:
      a slit forming step of forming a slit outside a processed body forming area in the workpiece plate along a long side of the processed body forming area, wherein the processed body forming area corresponds to an area formed as the processed body;
      an inner diameter removal step of punching a center portion of the processed body forming area in a circular shape; and
      a processed body removal step of punching the processed body forming area after the slit forming step and the inner diameter removal step, and
   wherein in the inner diameter removal step, the center portion is punched while a reinforcement member is inserted into the slit, and
   wherein in the inner diameter removal step, the center portion is punched in a state where the workpiece plate is fastened by inserting a pin into each pilot hole of a plurality of pilot holes which surround the processed body forming area, while the reinforcement member is inserted into the slit.

3. The method according to claim 1,
   wherein the inner diameter removal step is performed after the slit forming step.

* * * * *